United States Patent [19]

Csonka et al.

[11] 4,279,223
[45] Jul. 21, 1981

[54] INTERNAL COMBUSTION ENGINE FUEL-SAVING AND POLLUTION-REDUCING SYSTEM

[76] Inventors: John J. Csonka, 625 Linwood Ave., Buffalo, N.Y. 14209; Albert B. Csonka, 109 Larchmont Rd., Buffalo, N.Y. 14214

[21] Appl. No.: 109,496

[22] Filed: Jan. 4, 1980

Related U.S. Application Data

[63] Continuation of Ser. No. 905,996, May 15, 1978, abandoned.

[51] Int. Cl.$^3$ ............................................. F02M 25/02
[52] U.S. Cl. ............................... 123/25 N; 123/25 R; 261/18 A; 261/DIG. 66; 60/309
[58] Field of Search ................. 123/25 N, 25 J, 25 R; 60/309, 278; 261/18 A, DIG. 66

[56] References Cited

U.S. PATENT DOCUMENTS

| | | | |
|---|---|---|---|
| 1,713,377 | 5/1929 | Ecureux | 123/25 N |
| 2,076,606 | 4/1937 | Winter | 123/25 N |
| 2,604,309 | 7/1952 | DeBruin | 123/25 N |
| 2,671,311 | 3/1954 | Rohrbach | 123/25 R |
| 2,889,819 | 6/1959 | Lockheed | 123/25 N |
| 2,922,408 | 1/1960 | Humphries et al. | 123/25 N |
| 3,236,214 | 2/1966 | Johnson | 123/25 R |
| 3,682,142 | 8/1972 | Newkirk | 123/3 |
| 3,817,221 | 6/1974 | Nohira | 123/25 R |
| 3,842,808 | 10/1974 | Cataldo | 123/25 R |

*Primary Examiner*—Ira S. Lazarus
*Attorney, Agent, or Firm*—Christel, Bean & Linihan

[57] ABSTRACT

The present disclosure shows a system for providing a continuous supply of at least partly distilled water to an internal combustion engine for inclusion in the air-fuel mixture passing through the carburetor, in order to increase the efficiency of the engine to decrease fuel consumption, to reduce emissions and to prevent knocking. The water may be mixed and emulsified with the liquid fuel before these components enter the carburetor, or the fuel may be introduced to the carburetor separately, or the water and the fuel may be introduced together without a preliminary mixing. The partially distilled water, that is free of solid ingredients, is produced continuously during engine operation by diverting a portion of the exhaust gas from the engine to an air cooled condenser to condense water therefrom and a controlled amount of water is passed to the engine. Means are provided for variably proportioning the quantity of water delivered to the quantity of liquid fuel passing to the carburetor. This variable predetermined proportioning is automatically arranged so that no water is added at idling and small load settings, but at higher load settings the amount of water in proportion to the amount of liquid fuel is increased progressively as the load settings of the engine increase.

1 Claim, 2 Drawing Figures

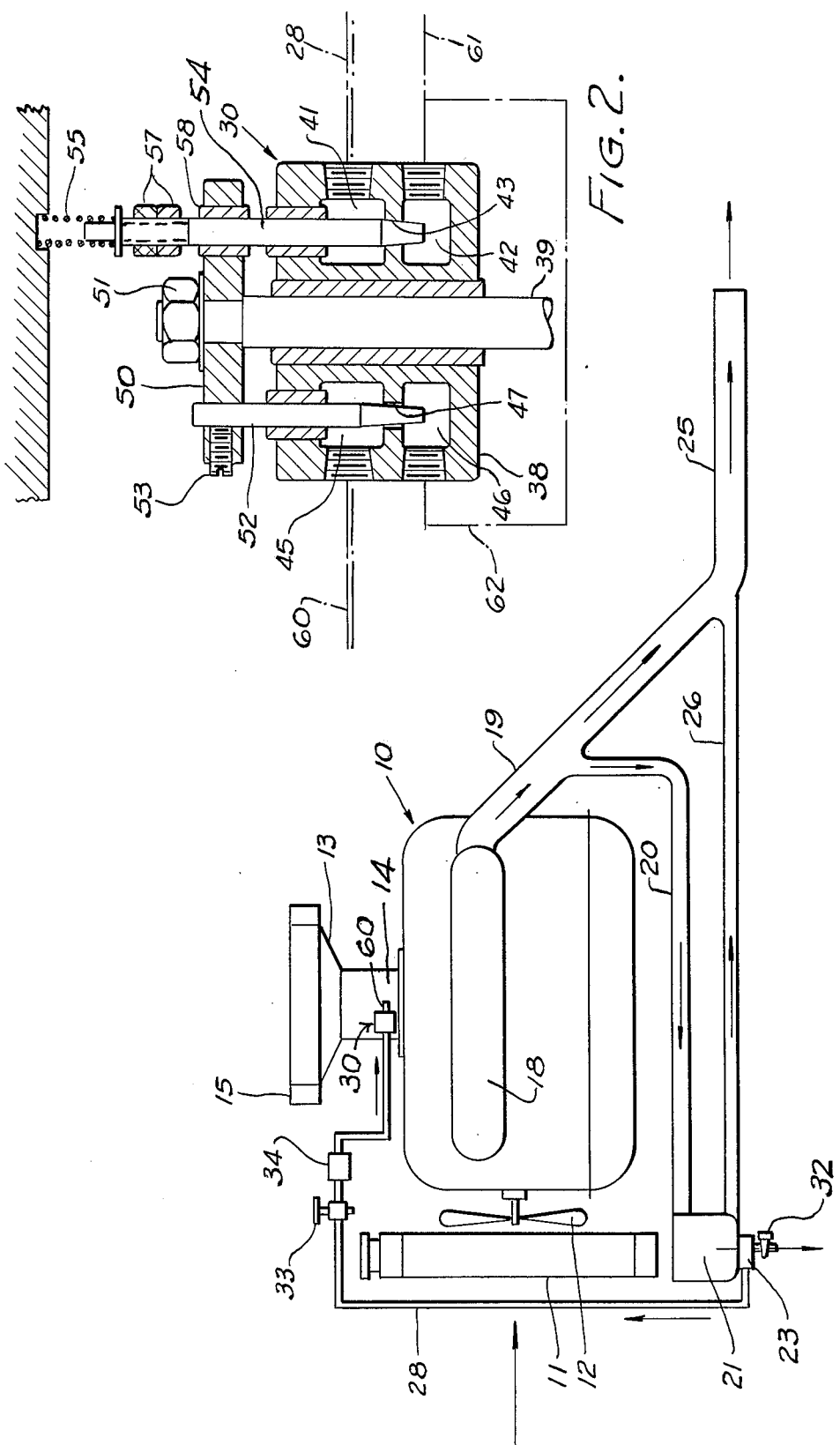

INTERNAL COMBUSTION ENGINE FUEL-SAVING AND POLLUTION-REDUCING SYSTEM

This is a continuation of application Ser. No. 905,996 filed May 15, 1978 now abandoned.

BACKGROUND OF THE INVENTION

This invention relates to internal combustion engines and more particularly to a new fuel-saving and pollution-reducing system, wherein controlled quantities of water are added to the usual hydrocarbon fuel in a novel and highly effective manner.

The problems of operating internal combustion engines efficiently throughout the wide range of speeds and loads to which they are subjected in automotive use has been present throughout the history of the inception and development of gasoline engine driven vehicles, and many expedients have been employed or attempted to solve these problems. At small loads the air throttle valve of the engine carburetor, which controls engine load, is in a nearly closed position, and the cylinders of the engine accordingly receive a small amount of air-fuel mixture and thus, the engine operates at a relatively low pressure and consequently at low thermodynamic efficiency. Operation under these conditions also produces maximum air-pollution. The net result is that present day internal combustion engines operate at relatively high efficiency only when the throttle is at, or near its full-open position. If the compression ratio of the engine is increased, it improves this inefficient small load operation, as well as the efficiency of the whole operation, but this introduces the problem of knocking at higher operating loads.

It has been known for many years that adding water to the air-fuel mixture of an internal combustion engine allows an increase in compression ratio without knocking and thus improves the overall efficiency. However, general use of this expedient has not been practical for a number of reasons, one of which is the lack of automatically controlling the amount of water introduced to the fuel system with respect to the quantity of liquid fuel being introduced. Among even greater problems may be mentioned the fact that the water thus introduced must be at least partially distilled water, with no solid ingredients, which is not always available, and with all prior systems this approach has required a water tank in addition to the usual fuel tank. Such systems also present a freezing problem with respect to the supply of the water in the water tank and the water delivery conduit.

SUMMARY OF THE INVENTION

The present invention provides a continuous supply of distilled water for delivery to the internal combustion engine of an automobile in predetermined variable ratios with respect to the quantity of liquid fuel being consumed by the engine. This is accomplished without the necessity for a water storage tank and there is therefore no problem of maintaining an adequate supply of distilled water, and the possibility of freezing the water is eliminated. This is accomplished by diverting a portion of the exhaust gas of the engine to an air cooled condenser where water vapor in the exhaust gas is liquified and conducted more or less directly to the engine by way of a heat insulated conduit containing a pressure limiting valve. The condensed internal cooling water of the engine is warmer than the ambient temperature and this warm water preheats the fuel, and that also improves the atomization of the fuel. The water content of internal combustion engine exhaust gas is about 1.4 times greater by weight than the weight of liquid fuel consumed by the engine.

In order to avoid freezing of this water when the engine stops, the conduit between the condenser and the carburetor contains a pair of automatic drain valves at the opposite ends of the conduit. When the engine is operating, both drain valves are closed. If solenoid valves are used, they are arranged to be moved to valve closing position by suitable electrical control means, preferably upon energization of the ignition circuit of the engine. When the engine stops, the valve at the bottom of the water collecting pot discharges liquid from the conduit, and the open valve adjacent to the carburetor allows air to enter the conduit and thus permits the water to drain from the conduit through the open lower valve. The valve at the water collecting pot is lower than the valve adjacent to the carburetor, and accordingly, turning off the ignition switch drains the conduit and the control means through the valve adjacent to the water collecting pot by gravity. Even after heavy loads, before the engine stops, it has to idle at least for a short time. Since during idle no water is added to the air-fuel mixture, when the engine stops, there cannot be water in the carburetor. Thus, water never freezes in the carburetor.

Normally, the pressure of the exhaust gas from the engine is sufficient to cause the water from the condenser to flow upwardly through the conduit to the carburetor but, if desired or found necessary, a pump may be interposed in the conduit.

Delivery and metering of water is independent of both the RPM of the engine, the pressure in the carburetor throat and the intake manifold, rather it depends on control mechanism located adjacent to the carburetor. Liquid fuel is delivered to the carburetor by way of this control mechanism in one embodiment of the invention, and means are provided therein for proportioning the flow of water with respect to the flow of liquid fuel. The control mechanism is adjusted to various positions by connection with the accelerator linkage or other means which normally controls the carburetor air inlet passage.

For effecting the forgoing variable proportioning of the water to fuel flow the control means contains, besides the fuel inlet valve a water inlet valve. These valves are arranged to move in a predetermined relation with respect to each other during opening and closing movements of the carburetor throttle control mechanism. Speaking generally, it is desired that the water inlet valve of the control means remain closed at idle position of the engine throttle and at small load settings thereof. In idle position and at small loads the liquid fuel inlet valve will be slightly open. The water inlet valve begins to open only at a predetermined degree of carburetor throttle-opening, and in the present form is arranged to have an increased degree of effective water flow area in proportion to the liquid fuel flow area as the carburetor throttle opening is advanced. This provides increasingly more water to the engine in proportion to liquid fuel as the throttle is advanced.

The foregoing general arrangement of the system permits, without knocking, the use of a higher compression ratio in a given engine which in turn decreases the problems of incomplete combustion and of low thermodynamic efficiency at small loads, at which times no water is added to the fuel. At higher loads the addition of water, which increases in proportion as the engine load increases, avoids the problem of knocking which is otherwise presented due to the unusually higher compression ratio. This greatly increases engine efficiency at all loads.

A great advantage of our system is that it atomizes the water as well as the fuel into micro-fine particles. Thus the present system needs less water to achieve a good cooling effect than any previously proposed water adding system.

The inclusion of water in the air-fuel mixture also causes large reduction of the nitrous oxide emission.

The fuel and the distilled water may be mixed and partially emulsified by a device located near the carburetor, which device delivers the emulsified fuel and water mixture into the carburetor. The emulsifying helps to loosen and evaporate the droplets of the mixture into lighter, fog-like particles which particles are still broken up by the large depression as the mixture passes the narrowest portion of the air passage.

BRIEF DESCRIPTION OF THE DRAWINGS

FIG. 1 is a schematic side elevational view of an internal combustion engine arranged in accordance with one form of the present invention; and FIG. 2 is a vertical cross-sectional view illustrating one form of the fuel and water proportioning means of the present invention.

DESCRIPTION OF THE ILLUSTRATED EMBODIMENT

In FIG. 1 the numeral 10 designates an internal combustion engine which may be of the type generally employed in automotive vehicles. A conventional radiator and cooling fan are indicated at 11 and 12, respectively.

The carburetor of the present invention is designated 13 in FIG. 1 and may be of the type shown and described in detail in our U.S. Pat. No. 4,119,068 issued on Oct. 10, 1978. In FIG. 1 the throat of the carburetor which leads to the conventional intake manifold (not shown) is designated 14, and the numeral 15 designates the usual air filter of the carburetor.

The exhaust gas manifold of the engine 10 is designated 18 in FIG. 1 and discharges into an exhaust pipe 19. As indicated earlier herein, the exhaust gas from the usual internal combustion engine contains a greater quantity of water in the vapor state than the quantity of liquid fuel being consumed by the engine. In accordance with an important principle of the present invention, any desired proportion of the exhaust gas in the exhaust pipe 19 is diverted into a conduit 20 which leads to a radiator-like vapor condensor 21 and water condensed therein discharges into a smaller water collecting pot 23. The remaining exhaust gas passes from the condenser 21 to the exhaust pipe or a tail pipe 25 by way of a conduit 26.

Water which is thus distilled from the exhaust gas in the condenser 21 is then fed from the water collecting pot 23 through a conduit 28 which leads ultimately to a liquid fuel and water proportioning mechanism designated generally by the numeral 30 in FIGS. 1 and 2.

The lower part of water collecting pot 23 is provided with an automatically operated drain valve 32, and an automatically operated valve 33 is interposed in the upper portion of conduit 28. Valve 32 is normally open and it may be closed by operation of a solenoid associated therewith. Also the valve 33 is normally open and it may be closed by operation of a solenoid. If solenoids are used, they are energized when the engine is running, so that at such times both valves are closed. When the engine is shut off, both valves automatically open to drain water from the conduit 28 and from water collecting pot 23, thus eliminating all water freezing problems.

Conduit 28 also contains an adjustable pressure limiting valve 34. Ordinarily, it is believed that the fluid pressure in the exhaust pipe and branch conduit 20 will be sufficient to produce a flow of distilled water upwardly in conduit 28 at the required pressure; but, if desired, a pump may be interposed in conduit 28.

The water and liquid fuel proportioning and control mechanism 30 will now be described with reference particularly to FIG. 2. The housing of the proportioning mechanism is designated 38 in FIG. 2 and may be supported against or adjacent to the carburetor 13. A control rod 39 is vertically slidable in housing 38 and is connected in any desired manner with the accelerator pedal of the vehicle or the speed control mechanism of other apparatus with which the engine may be associated. Rod 39 is normally urged downwardly by a spring and moves upwardly upon and in proportion to the motion of the accelerator pedal or other speed control device.

Housing 38 contains a water entry chamber 41 and a water discharge chamber 42 which are separated by a valve passage 43. Housing 38 likewise is provided with a fuel entry passage 45 and a fuel discharge passage 46 separated by a valve passage 47.

A cross bar 50 is fixed to the upper end of control rod 39 by a nut 51, and a valve 52 is adjustably fixed with respect to rod 50 by a setscrew 53. The lower end of the valve 52 is tapered as illustrated in FIG. 2 so that upward movement thereof increases the effective open area of fuel valve passage 47. The illustrated position in FIG. 2 may be the idle position of control rod 39.

A water control valve rod 54 vertically slidable with respect to bar 50 and control rod 39 is normally yieldably held in its closed lower position by a spring mechanism 55 which may react against any fixed portion of the carburetor housing or other fixed structure of the vehicle. The upper portion of water control valve rod 54 is threaded to receive a pair of adjusting nuts 57, and it will be noted that an adjusted degree of upward movement of control bar 50 from the position illustrated in FIG. 2 will bring a bushing 58 of control bar 50 into abutment with the lower end of lower nut 57, whereupon water control valve 54 will move upwardly jointly with fuel control valve 52.

The taper at the lower end of water control valve 54 is preferably of greater degree than the taper of fuel control valve 52 so that, after water valve 54 begins to move upwardly with fuel valve 52, it produces a progressively increasing open area of valve passage 43 with respect to the open area of fuel valve passage 47, and accordingly increasingly greater proportions of water will be introduced to the carburetor as the fuel valve moves to more open positions under increased loading produced by progressive advancement of the accelerator pedal or other speed control mechanism. The tapers of valves 52 and 54 need not be truly conical and any desired contours may be employed to obtain desired relationship therebetween.

It will be seen from the foregoing that by employing relative degrees of taper or other contour at the lower ends of the valves 52 and 54, by adjustment of the adjusting nuts 57 of the water valve, and by adjustment of the vertical position of fuel valve 52 by means of set-screw 53, a wide choice of relative water-to-fuel ratios may be selected to suit various conditions.

The water inlet conduit is designated by double dash-and-dot line 28 in FIG. 2, and the fuel inlet conduit is designated by numeral 60 in FIG. 2. These lines lead the fuel and the water to the carburetor by way of the housing of the water proportioning mechanism. The measured amounts of fuel and water enter the carburetor through conduit 61 and 62 respectively. These discharge conduits may be merged and simultaneously introduced to the carburetor jets, as for instance, at the intake port 38 of the carburetor disclosed in applicants' above-identified carburetor patent. In the alternative, the fuel and water may be introduced to the carbureting means by separate jets or passages in any other way so that they are atomized into a common air stream to the intake manifold of the engine.

As indicated generally above in the summary of the invention the liquid fuel and water proportioning mechanism may include mechanical means which is movably connected to the accelerator linkage of the carburetor or to the mechanism that normally controls the carburetor air inlet passage. This mechanism operates to move the water metering valve and allows the engine to feed only precisely predetermined amounts of water into the engine. This mechanism assures the delivery of the best minimum quantity of water which is needed when higher than usual compression ratios are applied.

A typical embodiment of the present invention has been described herein and shown in the accompanying drawing to illustrate the underlying principles of the invention, but it is to be understood that numerous modifications may be made without departing from the broad spirit and scope of the invention.

We claim:

1. A fuel-saving and pollution-reducing system for internal combustion engines having a carburetor for receiving liquid fuel and air and for delivering an air-fuel mixture to said engine, means for controlling the power output of the engine, and a conduit for conducting exhaust gases from the engine; said system increasing the efficiency of internal combustion engines by allowing the use of increased compression ratios by adding partly distilled cooling water into the carburetor, in the form of micro-fine particles and by automatically supplying the water in exactly predetermined amounts best suited to various loads; said system being usable with higher than usual compression ratios by adding water spray into the engine's combustion chamber to lower the temperature of the compressed air-fuel mixture during the compression stroke by the evaporation of the water-spray; the amount of water being independent of both the engine RPM and the intake manifold pressure of the engine; the water metering device being controlled by the accelerator linkage of the carburetor which determines at every engine load the optimum amount of water to be added into the engine; the water control means excluding water addition at idling and at small loads of the engine; said cooling water being constantly produced during the running of the car entirely by condensation of the water-vapor content of the exhaust gases of the engine in an air-cooled condenser.

* * * * *